United States Patent Office 2,957,768
Patented Oct. 25, 1960

2,957,768
FISH FOOD FOR SEA HORSES
Elizabeth L. Goetz, 6361 SW. 16th Terrace, Miami 55, Fla.
No Drawing. Filed Oct. 6, 1958, Ser. No. 765,307
9 Claims. (Cl. 99—3)

This invention relates to a food product and to the method of preparing the same, and more particularly, to a fish food product particularly edible by sea horses or the like.

The maintenance of sea horses in aquariums has, heretofore, been very difficult, and especially in small or home aquariums in which it has been almost impossible, in view of the many peculiarities of the sea horse and particularly in view of the eating habits thereof. The sea horse being a marine fish, lives only in the sea or salt water and feeds on a variety of very small fish and on various small forms of life or micro-organisms often not visible to the naked eye, but existing in vast quantities in the sea and oceans.

The maintenance of the sea horse in large aquariums usually found in public buildings, museums and other similar places where they have all the facilities for reproducing a natural sea life or environment and for providing natural foods for them has been possible under extreme care, but in small or home aquariums which lack all the facilities of the large aquarium, the maintenance of sea horses has been almost impossible particularly in view of lack of the proper food. The main difficulty in maintaining sea horses in the small or home aquarium has been the lack of natural foods which cannot be easily obtained and maintained, for the sea horse not only feeds on certain kinds of foods but feeds only on live food or forms of life and does not even approach anything inanimate.

Various forms of live food have been used for feeding sea horses with different degrees of success, but providing live food especially to areas far from the seashore where live food is usually found has been very impractical due to the many problems encountered in the maintenance, transportation and distribution of live forms of life edible by the sea horse. The peculiar habit of the sea horse to eat only food in a live state presents additional problems, for any dead food left in the tank or aquarium causes pollution of the water which is very harmful to sea horses and it should be changed immediately. It is apparent therefore that it would be very impractical to change the water in the tank, especially when only salt water can be used, every time the sea horse is fed for preventing pollution of the water by the dead food left therein.

Some of the natural foods edible by the sea horse consist of small copepods, baby shrimp and the like. Attempts have been made to feed live Daphnia to sea horses, but they were met with very little success for the Daphnia could live in salt water only about a minute. The dead Daphnia, therefore, had to be removed after each feeding for preventing pollution of the water. Also, Tubifex worms have been used for feeding sea horses, but these worms, like the Daphnia, do not live long in marine water. Other forms of live food that have been given to sea horses are the bloodworm, young guppies, brine shrimp eggs hatched and marine plankton available only in areas within accessible distance of the sea. However, all these forms of live food edible by the sea horse have presented various problems, are troublesome to supply and have not proven practical for universal use.

It is therefore the main purpose of the present invention to provide a food for sea horses, which overcomes all of the distinct disadvantages set forth above of the foods used heretofore for feeding sea horses in captivity, and which bears the closest similarity to the natural food of the sea horse.

It is also the purpose of the present invention to provide a food which can be fed in a dead, or not alive, state to sea horses and which has proven successful in keeping sea horses alive, in captivity, thus making possible the maintenance of sea horses to all marine fish hobbyists, regardless of their geographical location.

The food for feeding sea horses prepared in accordance with the present invention comprises mainly an animal or small form of life of the aquatic invertibrates, the technical name of which is *Gammarus fasciatus*, genus Gammarus, order Amphipoda of the Crustacea class. Gammarus is one of the many small forms of the Crustacea class that lives only in fresh water and thrives under a variety of conditions. This small form of life, the Gammarus, has a crescent-shaped body measuring approximately ¼ of an inch and is found in abundance in pools of fresh water where it feeds on aquatic plants. In view of its destructive characteristics to the plants, Gammarus has been considered a pest and it is usually destroyed. However, after a series of tests, the properly treated Gammarus has been proven an excellent food product for sea horses.

In accordance with the present invention the Gammarus is first collected by fine mesh nets especially constructed so as to allow all sand, mud and silt to sift through the net without permitting the Gammarus from escaping. The collected live Gammarus are then processed by first being passed through a coarse grade sifting medium, such as a net, to remove all large pieces of foreign matter. This may be accomplished by depositing the collected Gammarus in a tank containing fresh water which is allowed to drain through a coarse net, thereby permitting the Gammarus to escape as being carried by the draining water while retaining all large pieces of foreign matter in the tank. The Gammarus are then subjected to a series of three or more fresh water changes or rinses, as by being deposited in tanks with fresh water which is drained through nets of various sizes of mesh at the draining openings of each tank for insuring cleanliness of the finished product. This is very important, as foreign residue not only contaminates the food but quickly fouls aquarium water, and fouled or polluted water causes death to the sea horse. The Gammarus are then transferred to a designated aquatic place where they are cared for and fed for reaching the peak of their condition thereby producing a food of the highest nutritive value. After reaching the peak of their condition, the Gammarus are then again placed in a vessel of clean fresh water from which they are very carefully sorted to insure that each Gammarus is thoroughly cleansed and in live state before further processing. In final treatment, the Gammarus are sizesorted and then may be subjected to a bath containing a chemical compound, such as marine salts, for rendering ineffective any organic matter adhered thereto that might have detrimental effects on the sea horse. The thoroughly clean and chemically treated Gammarus are then, while still alive, packed into plastic bags or containers which are sealed and placed into freezing devices in which they are quickly frozen. The plastic bags with the frozen Gammarus may later be placed in boxes for distribution. The Gammarus may thus be maintained in the frozen state until such time as to be fed to the sea horses. The desired quantity of the Gammarus food product, so processed, may be placed while still frozen directly into the aquarium with the sea horses to be fed. It has also been found advantageous to add to the Gammarus while packed in the containers and before freezing beneficial water soluble medicants and/or vitamins which add to the nutritive qualities of the Gammarus.

It may thus be seen from the above description that the previously unused and destructive Gammarus, which in its natural fresh water habitat would have never fallen prey to the sea horse, prepared and processed in accordance with the present invention has not only provided a food in inanimate state which is readily available and which is acceptable by the sea horse, but it has made it possible for the sea horse to take his place among other practical aquarium pets.

The present invention has been described in detail above for purposes of illustration only, and is not intended to be limited by this description or otherwise, except as defined in the appended claims.

What I claim is:

1. A method of preparing a food particularly adaptable for feeding sea horses in captivity from live aquatic invertibrate animals of the genus Gammarus, order of Amphipoda of the Crustacea class, in form for ready feeding, said method comprising cleansing the animals in live state for removing foreign residue therefrom, and quick freezing the cleansed animals in the live state thereof.

2. A method of preparing a food particularly edible for sea horses in captivity from live aquatic invertibrate animals belonging to the genus Gammarus, order of Amphipoda of the Crustacea class, in form for ready feeding, said method comprising collecting the animals, passing the animals in live state through a series of cleansing mediums, freezing the clean animals in their live state in a solid block, and maintaining the animals in the frozen state.

3. A method of preparing a food particularly adaptable for feeding sea horses in captivity from live aquatic invertibrate animals belonging to the genus Gammarus, order of Amphipoda of the Crustacea class, in form ready for feeding, said method comprising collecting and cleansing the animals by a series of rinsings, packaging the clean animals, and freezing them in their live state into solid blocks.

4. A method of preparing a food particularly adaptable for feeding sea horses from live aquatic invertibrate animals of the genus Gammarus, order of Amphipoda of the Crustacea class, in form for ready feeding, said method comprising subjecting said animals to more than one rinsing for completely eliminating any foreign residue thereon, packing said animals into containers, and freezing said packed animals in their live state for maintaining them in a fresh condition.

5. A method of preparing a food particularly edible by sea horses from an aquatic invertibrate animal of the genus Gammarus, order of Amphipoda of the Crustacea class, in form for ready feeding, said method comprising rinsing said animals with a liquid medium for completely removing foreign residue therefrom, adding soluble vitamins to said animals in the live state thereof, and freezing said animals for maintaining them in a fresh condition only in which they are edible by sea horses.

6. A method of preparing a food particularly adaptable for feeding sea horses from live aquatic invertibrate animals of the genus Gammarus, order of Amphipoda of the Crustacea class, in form for ready feeding, said method comprising collecting the animals, removing foreign residue from the animals, size-sorting the animals and subjecting them through a cleansing bath, chemically treating the animals for rendering ineffective any organic matter thereon, placing the treated animals into containers and freezing them in their live state for being maintained in a fresh condition only in which said food is edible by sea horses in captivity.

7. A food product edible only in fresh condition by sea horses, comprising a plurality of an aquatic invertibrate animal of the genus Gammarus, order of Amphipoda of the Crustacea class, said animal being completely free of foreign organic matter residue, and said animal being frozen in its live state for being maintained in a fresh condition only in which it is edible by sea horses.

8. A food product edible only in fresh condition by sea horses, comprising aquatic invertibrate animals of the genus Gammarus, order of Amphipoda of the Crustacea class, said animals being thoroughly cleansed in live state of foreign residue and placed in containers, and said animals in said containers being frozen for being maintained in a fresh condition until consumption.

9. As a new article comprising a container, a plurality of aquatic invertibrate of the genus Gammarus, order of Amphipoda, of the Crustacea class, in said container, said aquatic invertibrates being thoroughly cleansed of foreign organic matter residue, water soluble medicants and vitamins being added thereto, and being frozen in the live state thereof, for being maintained in a fresh condition only in which they are edible by sea horses in captivity.

References Cited in the file of this patent

UNITED STATES PATENTS 1,016,627   Higgins _____ Feb. 6, 1912